United States Patent [19]

Armstrong

[11] Patent Number: 4,554,493
[45] Date of Patent: Nov. 19, 1985

[54] AUTOMATED WINDSHIELD WIPER SYSTEM

[76] Inventor: Howard L. Armstrong, 2730 Hollydale Dr., Homewood, Ill. 60430

[21] Appl. No.: 584,716

[22] Filed: Feb. 29, 1984

[51] Int. Cl.[4] .............................................. H02P 1/04
[52] U.S. Cl. .................................. 318/444; 318/483; 318/DIG. 2
[58] Field of Search ................. 318/443, 444, DIG. 2, 318/483, 643; 15/250 C; 200/61.05

[56] References Cited

U.S. PATENT DOCUMENTS

| | | | |
|---|---|---|---|
| 2,617,972 | 11/1952 | Nutter | 318/483 |
| 2,823,346 | 2/1958 | Weber | 318/483 |
| 3,487,492 | 1/1970 | Bischoff | 318/443 X |
| 3,826,979 | 7/1974 | Steinmann | 318/483 X |
| 3,868,492 | 2/1975 | Taylor | 340/602 X |
| 4,010,383 | 3/1977 | Grassmann | 318/483 X |
| 4,131,834 | 12/1978 | Blaszkowski | 318/483 |
| 4,317,073 | 2/1982 | Blaszkowski | 318/483 |

FOREIGN PATENT DOCUMENTS

| | | | |
|---|---|---|---|
| 2345546 | 3/1975 | Fed. Rep. of Germany | 318/483 |
| 1101441 | 1/1968 | United Kingdom | 318/443 |

*Primary Examiner*—William M. Shoop
*Assistant Examiner*—Bentsu Ro
*Attorney, Agent, or Firm*—Calvin E. Thorpe; Vaughn W. North; M. Wayne Western

[57] ABSTRACT

An apparatus for automatic activation and control of windshield wipers in response to moisture accumulation at the exterior surface of the windshield, including a pair of thin wires sandwiched within the windshield and positioned below the surface of the windshield to be cleared by the windshield wipers. The wires provide variable capacitance to a detection circuit, based on the amount of water occurring at the windshield surface. Activating circuitry is coupled to the detecting circuitry and wiper motor for initiating wiper action when capacitance measurement exceeds a predetermined reference standard.

4 Claims, 7 Drawing Figures

AUTOMATED WINDSHIELD WIPER SYSTEM

BACKGROUND OF THE INVENTION

1. Field of Invention

The present invention pertains to an automated windshield wiper system, and more particularly to a windshield wiper system which is automatically activated by moisture on the exterior surface of the windshield.

2. Prior Art

An effective windshield wiper system is essential for the operational safety of both vehicle and passengers. Modern windshield wiper systems provide a variety of speeds which permit the driver to adjust the rate of operation to specific weather conditions. For example, a typical switch or hand lever on the steering column of a motor vehicle has four positions. The off position disables the drive motor and discontinues operation of the wipers. High and low speed operation is provided for use in heavy to moderate rain or snow fall. In addition, many vehicles are equipped with an intermittent switch which permits adjustment of wiper operation. On various intermittent cycles the rate of operation may extend from a one to ten second time lapse between wiper reciprocations. This intermittent switch enables the driver to selectively adjust the wiper rate to a frequency of his own choosing, based on the driver's tolerance for moisture build up and wiper interference with his view.

In all cases with the aforementioned operating systems, the rate of reciprocation of the wipers is constant. Each reciprocation is followed by a specific time lapse which remains uniform until a different switch setting is applied by the driver.

It is rare, however, to find that a specific setting will meet the requirements of maintaining the windshield free of moisture, without frequent adjustment. For example, the rate of rain or snow fall can quickly change. Furthermore, passing vehicles may splash water from the road to cause an unexpected interruption to the driver's ability to see through the windshield. Substantial reaction time is often required to reach for the switch and make the appropriate speed adjustment to clear the window of moisture.

Because of the inconvenience of making adjustments to windshield wiper speed, several attempts have been made to provide a sensing system to automatically activate the wipers upon occurrence of a given amount of moisture on the windshield. U.S. Pat. No. 3,649,898 discloses a wiper control apparatus which includes two wires laid on the surface of the windshield. Wiper operation activates when a drop of water falls between the wires such that a short is created, providing an electrical path between the wires on the windshield. As the wipers pass over the water droplet, the wiper operation is disabled.

A similar design approach is disclosed in U.S. Pat. No. 4,317,073 by Blaszkowski. This reference teaches the use of exterior sensors to actuate low or high speed in accordance with the degree of rain or moisture precipitation. Sensors are primarily responsive to conductance between electrodes, or are sensitive to variations in temperature. German Pat. No. 2,057,062 also teaches the use of conductance for sensing moisture at the windshield surface. This reference discusses the use of adhesive foils separated at the windshield surface, the system being activated by measurement of resistance between the adhesive foil conductors.

The disadvantage of using conductance as a parameter for activating the windshield wipers arises from the requirement that the electrodes be placed on the exterior surface of the windshield. This location is essential in a conductance measurement because the moisture between the conductors is the variable factor, changing resistance and current flow between the conductors. Accordingly, the electrodes are directly exposed to corrosive influences of the elements, such as direct sunlight, moisture, smog, etc. In addition, mechanical separation of the electrode from the windshield surface may also arise because of exposure thereof to wind, wiper action, windshield cleaning materials, and comparable abrasive conduct applied at the windshield surface.

A second class of automatic wiper systems involve the measurement of capacitance. German Pat. Nos. 1,808,521 and 2,345,546 disclose circuits that involve measurement of capacitance between exposed plates. These references disclose the use of plates which are adhered to the interior windshield surface and which are coupled to a high frequency oscillator. Each of the latter references disclose the measurement of moisture content at the exterior windshield surface by high frequency differentiation. Here again, however, the positioning of plates at the exterior surface of the windshield creates risk of inadvertent removal or abrasion and insufficient sensitivity. Also, the corrosive effects of the environment can effect capacitance or capacitive readings. Even on the interior surface of the window, risk of manual abrasion or tearing, as well as change of permittivity by the accumulation of oily films from airconditioners and the like, can adversely effect system operation. Where conductors or plates are thin, their positioning on exterior surfaces creates even a greater likelihood of breakage and separation. If wider conductors are used, driver view is obstructed. This will be particularly true of conductors positioned on the interior surface of the windshield. In addition to the sensitivity and wear factors previously discussed, consideration must be given to cost of the activating system. Because this is a convenience item, excessive cost will defeat its application in most vehicles. What is needed, therefore, is an inexpensive detection system which is not exposed to abrasion, wear and tear; yet is capable of measuring moisture build up at the windshield surface.

OBJECTS AND SUMMARY OF THE INVENTION

Is is an object of the subject invention to provide an automated control for windshield wipers responsive to moisture accumulation at the exterior surface of the windshield.

It is a further object of the present invention to provide a detection circuit which includes capacitance measurement at a low instead of a high frequency.

It is a still further object of the present invention to provide a detection circuit which is not exposed to exterior surfaces of the windshield where adverse wear and weather conditions could effect the operation of the system.

Yet another object of the present invention is to provide an automated control system for windshield wipers which is responsive to capacitance measurement, yet where the capacitor plates do not obstruct or block the view of the driver.

It is a still further object of the present invention to provide a space apart plate configuration which maximizes the amount of window surface measured for moisture build up.

These and other objects are realized in an apparatus for automated control of windshield wipers which is responsive to moisture accumulation at the exterior surface of the windshield. The apparatus includes a pair of thin wires which are embedded within an interior portion of the windshield between the exterior surfaces. The location area is below a surface area which is to be subject to the cleaning action of the windshield wipers. The wires are spaced apart to a distance which is predetermined to establish a capacitance value within a range wherein the occurrence of moisture on the windshield surface between the wires yields a readily detectable capacitance increase. Detection circuitry is coupled to one end of the respective wires and operable to detect and register the resultant increase in capacitance upon accumulation of moisture at the exterior windshield surface between the wires. Drive means coupled to the windshield wipers are initiated by activating circuitry coupled between the detecting circuitry and the drive means. The activating circuitry is also responsive to the detected increase in capacitance between the thin wires.

Various specific embodiments are disclosed, such as the placement of the wires within a polymer laminate which is sandwiched between two plates of glass making up the windshield. This embodiment provides a very low profile, non-noticeable capacitor plate arrangement which covers a broad surface area of the windshield. The system is capable of operating at a low range of frequencies, such as between the range of one KHz to 500 KHz.

The subject invention is sensitive to moisture build up at the windshield surface; however, it operates from sensors which are encased within the windshield material. Thus, the capacitor plates are totally protected from the environment, as well as from abrasive contact from the windshield wipers or a person cleaning the windows. The low range of frequency operation prevents the capacitor plates from acting as transmitting antennae.

Other objects and benefits of this present invention will be apparent to those skilled in the art based upon the following detailed description taken in combination with the following drawings, wherein.

DETAILED DESCRIPTION OF THE INVENTION

Figure 1:
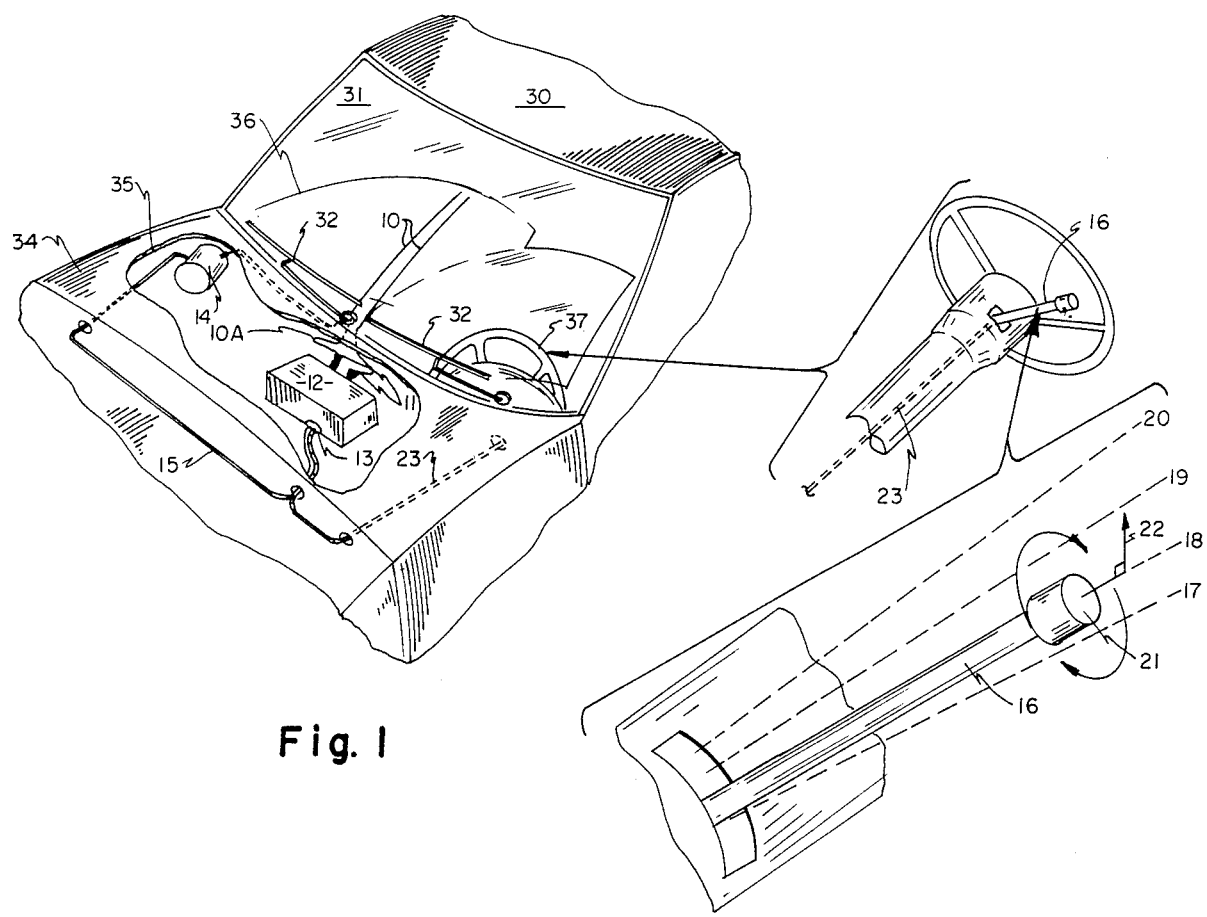
FIG. 1 is a graphic representation showing the placement of the sensor wires within the windshield and attachment of associated circuitry responsive to capacitance increases therebetween.

Referring now to the drawings:

FIG. 1 shows a partial view of a vehicle 30 with a windshield section 31 a pair of windshield wipers 32 are shown at rest. These wipers 32 are driven in reciprocating movement by a wiper motor 14 which is usually positioned under the hood 34, which is shown in partial cutaway view 35. As the wipers 32 reciprocate across the windshield 31, they traverse a geometric area which is circumscribed by a geometric configuration having a perimeter 36. This area is referred to hereafter as the surface area of the windshield.

The steering column 37 is shown in a sectional enlargement with a selector switch 16 attached to a cable 23, which ties into drive circuitry. A more detailed view of the selector switch 16 is also shown in FIG. 1, with positions illustrated as numerals 17, 18, 19 and 20. The selector switch may be placed in one of these four positions as part of the means for controlling wiper operation. For example, the off position 17 totally disables the windshield wiper system. Position 19 reflects a low speed operation, while position 20 is for high speed use. As is customary, a washer control 22 is provided to pump washer fluid to the windshield surface.

In the present invention, position 18 has been allocated for selector control of the moisture activated, wiper drive system. By placement of the selector lever 16 into the automatic 18 position, the driver activates an automatic windshield wiper system as described hereafter. Selector 16 also includes an adjustment 21 which permits selection of moisture level sensitivity required to activate movement of the wipers 32.

This automatic control circuitry is housed within a water proof box 12 which is positioned forward of the passenger compartment in a small shelf area under the hood or dashboard. Ideally, this box 12 is positioned at the terminal ends of the sensor wires and in proximity to the wiper linkage arms (not shown), wiper motor 14 and washer motor (not shown). Circuitry within the box 12 is coupled to the wiper motor 14 and selector switch 16 via cables 15 and 23 respectively. A more detailed description of the circuitry contained within the box 12 is provided hereafter.

Figure 5:
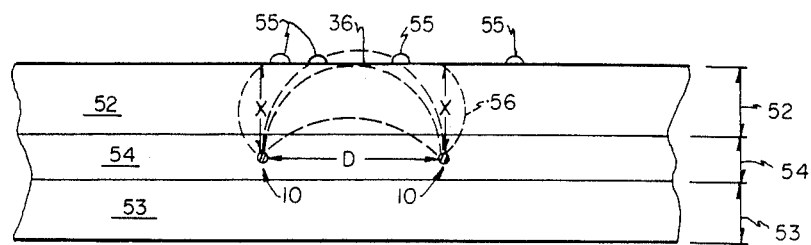
FIG. 5 is a cross section view of the embedded sensor wires within the windshield illustrated in FIG. 1.

A pair of sensor wires 10 are embedded within the windshield as illustrated in the cross section view of FIG. 5. This construction is similar to the windshield construction for an embedded AM antenna. In this case, the wires 10 are embedded within a vinyl or polymer layer 54 which is sandwiched between two sheets of glass 52 and 53. Typical dimensions for this construction are 0.23 cm in thickness for the glass and 0.08 cm for the vinyl with embedded wire sensors. It will be apparent that other dimensions could be used in an effort to optimize any particular parameters such as, X the distance from the embedded wires 10 to the glass surface 36.

Therefore, the capacitance between wire sensors 10 will be a function of the dielectric constant of the materials which conduct the electric flux lines 56. It should be noted that the wire sensor 10A exiting the windshield should be separated or otherwise shielded from further capacitive interaction. Typical approximate values for the glass 52, 53 and the vinyl 54 are 7–8 and 2 respectively. The actual formula for capacitance is:

$$C = \frac{\pi \epsilon_0 \epsilon_r L}{\ln\left[\left(\frac{D}{R}\right) + \sqrt{\left(\frac{D}{R}\right)^2 + 1}\right]}$$

Wherein L is the length of wire sensors 10, R is the radius of the respective wire sensors and D is the distance between the sensors. It is apparent, therefore, that a change in dielectric constant $\epsilon_r$ results in a proportional change to the value of capacitance.

As water droplets 55 occur at the windshield surface 36 (see FIG. 5) the electric flux lines 56 experience a material of differing permittivity. Whereas the dielectric constant of air is only one, the flux lines now experience a material with dielectric constance of approximately eighty. Accordingly, a change in capacitance occurs between the respective sensors 10. The present invention relies upon the fringe effect of capacitance variation in view of the fact that the dielectric constant of the glass and vinyl remain fixed for any given windshield. Therefore, the detectional changes in capacitance occur by reason of variations in dielectric materials in the fringe areas such as is shown by the water droplets 55 in FIG. 5. It has been discovered that detection of capacitance changes within these fringe areas provides a unique benefit by yielding capacitance changes which are workable within an inexpensive system as disclosed hereafter. Furthermore, separation distances between the wire sensors 10 are readily adaptable for windshield construction. Furthermore, the physical parameters involved in capacitance values (such as wire radius, length and separation) are well suited for fringe effect detection.

The increased sensitivity developed by the fringing effect is a result of the flux lines being shunted around the glass and vinyl, which have low dielectric constants, through the water layer at the windshield surface, with its relatively high value. Two considerations favor a design which places the wires 10 at maximum separation. First, the fringing result is optimized when the angle at which the flux line leaves the surface of the conductor and merges with the water layer is minimal. This represents a resistance toward sharp bends in the field pattern. Second, greater separation distances have the effect of increasing the amount of windshield surface area subject to capacitance measurement. The combined effect is that a larger sample area allows given flux lines to travel a greater distance through the water.

The trade-off is that separating the conductors decreases the capacitance, while increasing the effective fringing area. It has been found that increasing separation distance much beyond 2.5 cm drops the capacitance to values in the low pf range. Therefore, an ideal range of separation for the wire sensors is between 0.75 cm and 3.0 cm, with 2.5 being the approximate optimum value. These values correspond to a favorable range of capacitance between the approximate values of 18 pf on the low side to 5 pf at greater separation distance.

Figure 2:
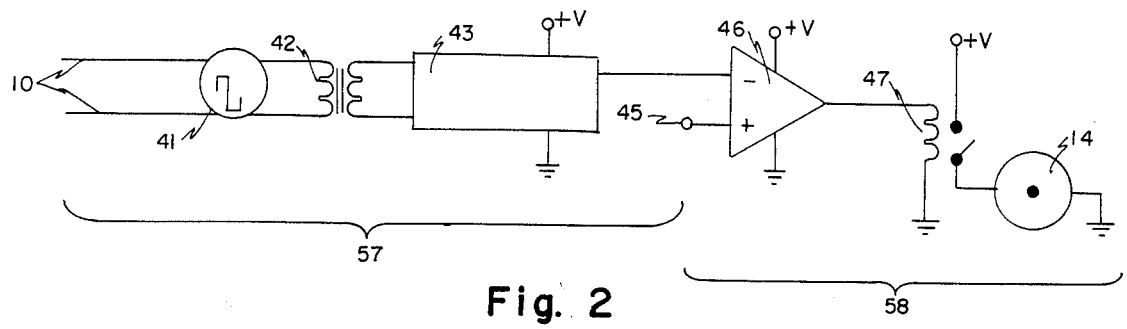
FIG. 2 is a block diagram of one embodiment for the basic circuitry coupled to the wire sensors within the windshield.

FIG. 2 illustrates a basic block diagram for a suitable circuit to detect the subject change in capacitance. Sensor wires 10 act as a sampling capacitor for a square wave oscillator 41. The square wave generated by this oscillator 41 has a frequency which is proportional to the value of capacitance arising between sensors 10. Accordingly, a high value of capacitance corresponds to a low frequency, while a lower value of capacitance corresponds to a higher frequency. The approximate value of capacitance for the sensors illustrated in FIG. 1 is 8 pf. This is based on the use of 36 gauge wire (0.0127 cm), a separation distance L of 2.54 cm and a wire length W equal to approximately 21 cm. The glass and vinyl dimensions have been previously stated. The corresponding frequency of the oscillator 41 with the windshield in dry condition is approximately 10 KHz. As the capacitance value of sensor 10 starts to change with the occurrence of water droplets 55 between the sensor wires 10, the frequency of the oscillator 41 decreases. This change in frequency is detected by a frequency-to-voltage convertor 43. The subject convertor 43 operates within a range of 10 KHz to 1 KHz, outputting a DC voltage from 10 v to 1 v respectively. This portion of the circuitry comprising the sensors 10, oscillator 41, the voltage convertor 43 and a coupling transformer 42 comprise what shall be referred to hereafter as the detection circuitry 57. This circuitry functions to develop a signal at its output which corresponds to changing capacitance values detected between sensors 10. It will be apparent to those skilled in the art that comparable circuitry could be substituted to realize this same objective.

The output of the detection circuitry is coupled to a comparator 46 which compares the voltage output of the voltage convertor 43 to a reference voltage 45. This reference voltage is set by the driver of the vehicle on the adjustment 21. When the output of the voltage convertor 43 is lower than the reference voltage 45, the output of the comparator 46 drives relay 47 and causes the wiper motor 14 to operation.

As the water is cleared from the windshield surface 36, the capacitance value is lowered, causing a corresponding increase to the frequency and increase in voltage as detected by the comparator 46. Accordingly, the output of the comparator is disabled and the wipers then return to rest. The current cycle of the wiper operation is completed by virtue of a park or home switch 49 (FIG. 3) which requires a completed reciprocation of the windshield wipers before the wiper motor is disabled. This latter circuitry is generally referred to herein as the activation circuitry 58. In constant rain, water droplets are sensed at the conclusion of each cycle of wiper operation, immediately activating the next and repeated cycles. During each cycle operation, circuitry is provided to disable the output from the comparator 46 until the wiper returns to its home position, ready for the next activating signal.

Figure 3:
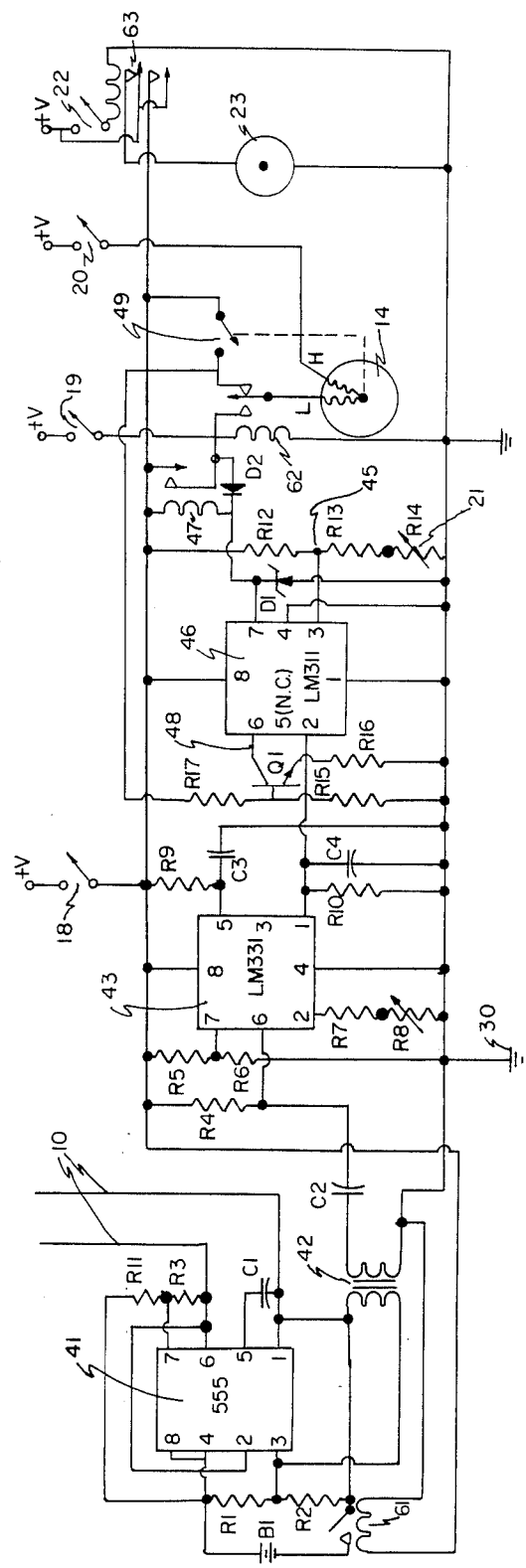
FIG. 3 is a schematic drawing of one example of circuitry which controls automatic operation of the wipers in response to capacitance increases between the sensor wires.

Referring to FIG. 3, a separate 15 volt battery B1 is utilized to power the oscillator 41. The relay 61 and separate battery B1 provide for isolation of the oscillator 41 and sensor wires 10 from the vehicle chassis ground 30. Such isolation is important to maintain maximum sensitivity for the detection of change in capacitance. It has been discovered, for example, that failure to isolate wire sensors 10 results in parasitic capacitance and additive effects from vehicle chassis ground which upset the inherent balance of the system. Experimental results showed measured capacitance to increase by 500% when chassis ground was included on either side of the capacitor. This has the effect of lowering the percentage of change in capacitance arising from water at the windshield area. Accordingly, instead of realizing a 12.5% change by a 1 pf increase from 8 pf to 9 pf, a mere 2.5% change occurs when parasitic capacitance increases the detected change from 40 pf to 41 pf. For this reason, transformer 42 was inserted as shown in FIG. 2.

Relay 61 initiates power to the oscillator 41 when a 12 volt signal appears on the supply for the rest of its circuit via the automatic switch position 18. Frequency of oscillation is controlled by the RC time constant of R3, R11 and sensors 10. The generated square wave is passed to the rest of the circuit via transformer 42, which also provides isolation of the oscillator 41 and sensor 10 from vehicle ground. C2 filters out any DC component in the signal from the oscillator 41 to the voltage convertor 43, across transformer 42. Threshold biasing of the voltage convertor 43 is accomplished by resistors R5 and R6. R7 and R8 are used to adjust the voltage gain of the convertor 43. Pin 8 is plus V (vehicle 12 volts supply) and pin 4 is ground. R9 and C3 supply the time constant for the sampling rate taking place within the voltage convertor chip 43. The DC output voltage is coupled to pin 2 of the comparator 46 via R10 and C4 from pin 1 of the converter 43. Pin 8 is plus V supply and pin 1 is ground.

Strobing circuitry is included to disable the output of the comparator when the park switch 49 is released. This is accomplished by pulling current from pin 6. Q1 is biased so that a 12 volt signal to R17 from the park switch 49 will turn it on, drawing the required current from pin 6 of the comparator 46. This disables the output (pin 7) until current ceases to be pulled from pin 6. Pin 2 and pin 3 are the differential inputs to the comparator 46. Pin 2 is supplied with an input signal from the convertor 43, while pin 3 is supplied a reference voltage from another source. In this case, the reference voltage is derived from a voltage divider consisting of resistors R12, R13 and R14. It will be noted that R14 is a variable resistor corresponding to the sensitivity adjustment 21 at the selector switch 16. D1 guards against backlash from induced currents in relay 47. D2 eliminates chatter caused by oscillating voltages and currents induced in both relays 47 and 62.

Switch 19 is the manual low position activating only relay 62 and thus wiper motor 14. The subject automatic mode is activated when switch 18 is closed and 19 is open. In this mode the output of comparator 46 will activate both relays 47 and 62 which in turn activate the wiper motor 14. Here again, it will be apparent that other circuits can be adapted to implement the same invented steps which are illustrated by the present embodiment.

Figure 4:
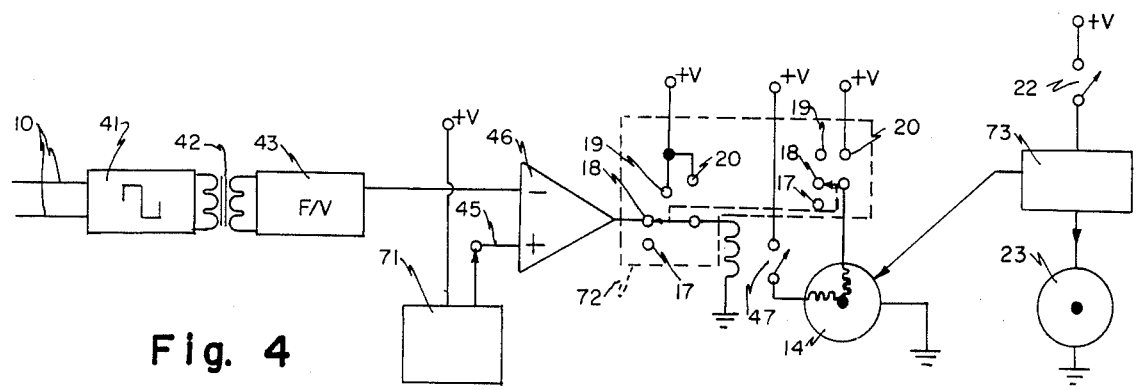
FIG. 4 shows an alternative block diagram of basic circuitry for operation of the subject invention.

FIG. 4 illustrates several modifications to the basic circuitry. For example, a voltage regulation circuit 71 has been introduced to give better voltage regulation than that which can normally be provided by the vehicle's electrical system. Alternatively, a small battery may be used to supply the reference voltage used in conjunction with very large resistances for low current draw and for providing the comparator 46 with the required adjustable voltage reference 45.

Figure 6:
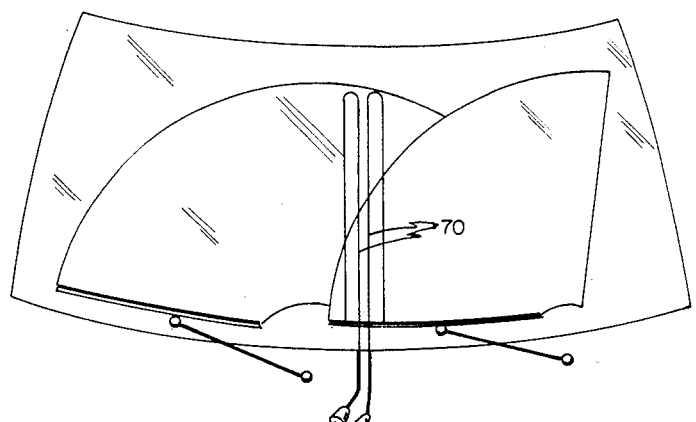
FIG. 6 illustrates another embodiment showing a different geometric configuration for the sensor wires.
Figure 7:
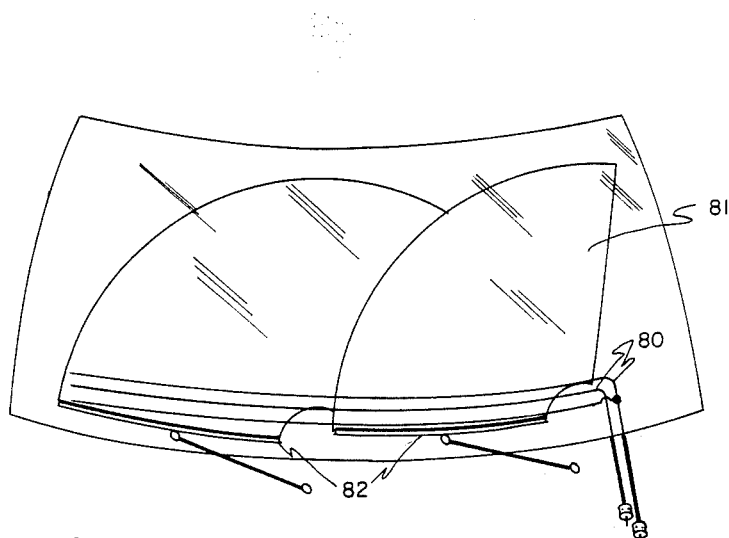
FIG. 7 illustrates an additional sensor geometric configuration having horizontal orientation.

An additional improvement, represented by item 72, comprises a ganged four position switch 72 which would include mechanically linking the high and low speed positions to a signal contact point 19 (FIG. 4). Some modification would be anticipated, based on the various differing designs in different makes of vehicles. In addition, a timing circuit 73 can be utilized to incorporate automatic wiper operation for two or three cycles when the washer motor 23 is engaged. FIG. 4 illustrates how this well known circuitry could be included within the proposed circuit design for a capacitance sensitive automated system. Although the present system discloses alternative linkage of the automated circuit with either the high or low motor speed, additional circuitry can be provided to provide automatic selection of wiper speed based upon the amount of moisture at the windshield surface. For example, whereas 8 pf might correspond to a dry-off position for the wipers, a 9 pf capacitance might switch the system into auto with speed selection capable of being set by the driver at speed rates lower than the low speed position 19 (FIG. 1). If the capacitance reaches 10 pf, circuitry could automatically switch to the low speed wiper operation rate. Likewise, when capacitance exceeds 11 pf, the circuitry could switch to high speed operation, corresponding to heavy rain conditions. It will be apparent that other capacitance ranges and activation levels can be applied, depending upon local weather conditions or personal preference of the driver. The foregoing description of preferred embodiments is given for illustrative purposes only. For example, other geometric arrangements for the positioning of sensor wires are envisioned. FIG. 6 illustrates a configuration wherein the sensor wire 70 is almost twice the length of the former wires 10, the additional length being wrapped around and extended in parallel orientation as illustated. FIG. 7 depicts a configuration for the sensor wires 80 wherein the wires are placed in horizontal position. It should be noted that this configuration provides a greater surface area coverage for that portion of the windshield 81 which is traversed by the windshield wipers 82. Other geometrical configurations and alternatives for the disclosed embodiments will be apparent to those skilled in the art, based upon the preceding detailed description.

We claim:

1. An apparatus for automated control of windshield wipers in response to moisture accumulation at the exterior surface of a windshield, said apparatus comprising:
   a. a pair of thin wires embedded within an interior portion between opposing exterior surfaces of the windshield and below a surface area which is subject to the cleaning action of the windshield wipers, said wires being spaced apart to a separation distance predetermined to establish a capacitance value within a range wherein the occurrance of moisture on the windshield surface between the wires yields a readily detectable capacitance increase;
   b. detection circuitry coupled to one end of each of the respective wires and operable to detect and register the resultant increase in capacitance upon accumulation of moisture at the exterior windshield area between the separated wires;
   c. drive means coupled to the windshield wipers for reciprocating the wipers over the surface area of the windshield to be cleared of moisture;
   d. activating circuitry coupled between the detecting circuity and drive means for activating the drive means into operation, said activating circuitry being responsive to the detected increase in capacitance between the thin wires; and
   e. means for momentarily disabling the activating circuitry after a predetermined number of reciprocations of the wipers to provide for a new measurement of moisture content at the windshield surface.

2. A device as defined in claim 1 wherein the disabling means comprises means for strobing the activating circuitry in accordance with the rate of wiper reciprocation thereby disabling circuitry output and requiring each reciprocation to be activated by an independent measurement of moisture at the windshield.

3. An apparatus for automated control of windshield wipers in response to moisture accumulation at the exterior surface of a windshield, said apparatus comprising:
   a. a pair of thin wires embedded within an interior portion between opposing exterior surfaces of the windshield and below a surface area which is subject to the cleaning action of the windshield wipers, said wires being spaced apart to a separation distance predetermined to establish a capacitance value within a range wherein the occurrance of moisture on the windshield surface between the wires yields a readily detectable capacitance increase;
   b. detection circuitry coupled to one end of each of the respective wires and operable to detect and register the resultant increase in capacitance upon accumulation of moisture at the exterior windshield area between the separated wires, said detection circuitry comprising an oscillator coupled to the pair of wires, a frequency to voltage converter coupled to the oscillator for changing the frequency output to a voltage output, a comparator coupled to the voltage output for comparing the voltage level with a predetermined reference voltage;
   c. drive means coupled to the windshield wipers for reciprocating the wipers over the surface area of the windshield to be cleared of moisture; and
   d. activating circuitry coupled between the detecting circuitry and drive means for activating the drive means into operation, said activating circuitry being responsive to the detected increase in capacitance between the thin wires, the activating circuitry comprising a relay coupled to (i) the comparator, (ii) the drive means and (iii) to a power source and being operable to switch on the drive means in repsonse to an activating signal from the comparator.

4. A device as defined in claim 3, further comprising adjustable regulating means for selecting and maintaining the reference voltage to a particular moisture level sensitivity at the windshield, thereby allowing a driver to preset the sensitivity at which the automatic wiper system is activated.

* * * * *